K. B. MILLER & W. KAISLING.
TELEPHONE SUPPORT.
APPLICATION FILED SEPT. 16, 1908.
995,704.
Patented June 20, 1911.
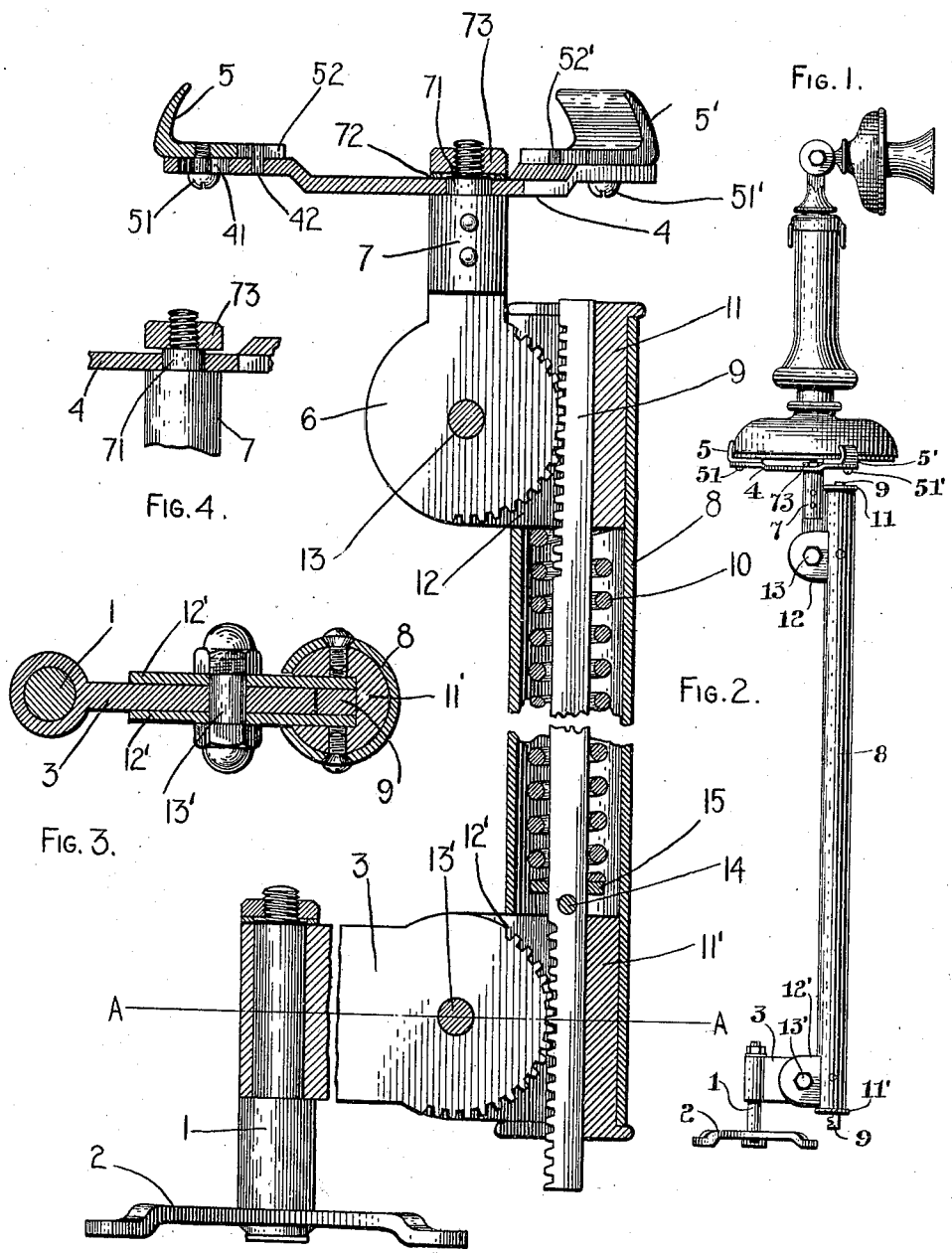

UNITED STATES PATENT OFFICE.

KEMPSTER B. MILLER AND WILLIAM KAISLING, OF CHICAGO, ILLINOIS.

TELEPHONE-SUPPORT.

995,704.

Specification of Letters Patent. Patented June 20, 1911.

Application filed September 16, 1908. Serial No. 453,333.

*To all whom it may concern:*

Be it known that we, KEMPSTER B. MILLER and WILLIAM KAISLING, citizens of the United States of America, and residents of Chicago, county of Cook, and State of Illinois, have invented a new and useful Improvement in Telephone-Supports, of which the following is a specification.

Our invention is an attachment for telephones and constitutes an improved support for desk equipments.

In the drawings we have shown our invention as an integral device adapted for attachment to the top of the desk and adapted to receive and support a portable desk stand of the ordinary type; however our invention is adapted to be built as a part of a complete desk equipment if so desired.

We provide a support substantially of three parts, of which one attaches to the desk, another to the telephone to be supported, and a third or intermediate part connects the two in such manner that the desk stand may be swung out of the way, remaining poised in any position and remaining always plumb.

In the drawings Figure 1 shows assembly with desk stand; Fig. 2 shows section through the center line of the device upon a plane perpendicular to the direction of viewing of Fig. 1; Fig. 3 shows horizontal section upon the line A—A of Fig. 2; Fig. 4 shows a modification.

The part for attachment to the desk comprises vertical standard 1 having a foot piece 2. Sleeved upon the standard 1 is the toothed member 3.

The desk stand supporting part comprises a plate 4 having slidable clamping jaws 5 5'. The plate 4 is attached to the toothed member 6 by means of the shouldered lug 7. The detail of the sliding clamp comprises a slot at 41 which clears the clamping screw 51, and a pin 42 spanned by slot 52 in jaw 5. The detail of attachment to lug 7 is as follows: Shoulder 71 is longer than the thickness of plate 4; washer 72 has an inner opening sufficient to pass over shoulder 71. Lock nut 73 clamps plate 4 rigidly upon lug 7 by clamping washer 72. If it be desired that plate 4 shall be loosely held upon lug 7 to permit the rotation of the desk stand upon its support, washer 72 may be removed and nut 73 then will take seat upon shoulder 71 rather than upon plate 4, thus leaving the plate 4 loosely held. This modification is shown in Fig. 4.

The connecting portion of the support comprises tube 8 containing rack 9 and compression spring 10. Castings 11 11' fit in the ends of the tube 8 and are provided each with a pair of wings 12 12' which project from the tube 8 and between the pairs of which toothed members 6 and 3 respectively are supported rotatively by bolts 13 13'. Rack 9 slides between the pairs of wings 12 12' and in toothed engagement with parts 6 and 3. Transverse pin 14 passes through rack 9 and supports washer 15. Compression spring 10 lies between part 11 and washer 15 and presses downwardly upon rack 9, acting through washer 15 and pin 14.

Referring now to operation within the plane of Fig. 2, it will be seen that part 3 is motionless and that part 8 and its assembled details may revolve upon bolt 13 as a pivot. When part 8 revolves to the right, rack 9 will be forced upward with respect to tube 8 by the action of teeth on parts 3 and 9. This relative motion of parts 9 and 8 will compress the spring 10 and place an added tension upon rack 9, tending to force it downward. At the same time the line of direction of the center of gravity of the supported desk stand will move to the right of the point of support, which is the bolt 13', and the weight of the desk stand will tend to revolve the tube 8 farther to the right, which will result in a further compression of the spring 10 and a still higher tension upon part 9. The effective thrust of the weight of the desk stand is at all times the weight thereof multiplied by a constant and the cosine of the angle of the tube 8, with the vertical and therefore increases as the tube 8 approaches the horizontal. The tension of the spring 10 increases also as the tube 8 approaches the horizontal. The rate of variation of the tension of spring 10 depends upon the radius of the arc of teeth in the part 3; this radius and the normal tension of the spring 10 are so adjusted in the design before manufacture that when the device is assembled and is bearing a desk stand of a predetermined weight, the thrust of the spring 10 shall at all times approximate the thrust of the weight of the movable end of the support and the desk stand borne thereby. Parts 3 and 6 are held between wings 12' and 12 respectively by bolts 13' and 13 respectively, capable of pressing the wings into close frictional contact with the parts 3 and 6, and frictional adjustment thus being attained by which the support remains motionless under the maximum difference of tension between the thrust of spring 10 and the effective weight of the supported desk stand.

Part 6 has its teeth arranged on the same radius as part 3 and therefore lug 7 will remain at all times perpendicular, this relation being maintained by the sliding of rack 9 acting upon the two toothed parts 3 and 6, the pivots 13' and 13 remaining necessarily at a fixed distance from each other.

The sleeving of part 3 upon part 1 permits the swinging of the supported telephone instrument in any horizontal circle regardless of its position in the vertical arch available by a movement of the tubular portion 8.

Having thus described our invention, what we claim as new and desire to secure by United States Letters Patent is:

1. In a support for a telephone, a toothed member fixed with reference to vertical movement; a toothed member adapted to receive and hold a telephone; a straight tube connecting said two members and pivotally attached to both of them; a rod slidable with respect to said tube and engaging the teeth of both of said toothed members; and a spring between said rod and said tube, said rod and said spring being contained within said tube.

2. In a support for telephones, a toothed member fixed with reference to vertical movement; a toothed member adapted to receive a telephone; a connecting member for said toothed members and pivotally attached thereto and a toothed sliding rack associated with said connecting member and engaging the teeth of both of said toothed members.

3. In a support for telephones, a toothed member fixed with reference to vertical movement; a toothed member adapted to receive a telephone; a connecting member for said toothed members and pivotally attached thereto; a toothed sliding rack associated with said connecting member and engaging the teeth of both of said toothed members; and a spring carried by said connecting member and engaging at one end said connecting member and at the other end said sliding rack.

4. In a support for telephones a toothed member fixed with reference to vertical movement; a toothed member adapted to receive a telephone; a tubular connecting member for said toothed members and pivotally attached thereto; a toothed sliding rack mounted within said tubular connecting member and engaging the teeth of said toothed members; and a spring surrounding said rack and within said tubular member and engaging at one end said rack and at the other end said tubular member.

5. In a support for telephones, a toothed member fixed with reference to vertical movement; a toothed member adapted to receive a telephone; a tubular connecting member for said toothed members and pivotally attached thereto; a toothed sliding rack mounted within said tubular connecting member and engaging the teeth of said toothed members; and a spiral compression spring within said tubular member and surrounding said sliding rack and engaging at one end said tubular member and at the other end said rack.

6. In a support for telephones, a pedestal member for attachment to a desk; a member for attachment to a telephone; a connecting member having a sliding toothed member as a part thereof; an intermediate toothed member pivoted upon said connecting member, supported by said pedestal member and mechanically geared to said sliding toothed member; and a second intermediate toothed member pivoted upon said connecting member, united to said telephone supporting member and mechanically geared to said sliding member.

7. In a support for telephones, a pedestal member for attachment to a desk; a member for attachment to a telephone; a connecting member having a spring-pressed sliding toothed member as a part thereof; an intermediate toothed member pivotally connected to said connecting member supported by said pedestal member and engaging the teeth of said spring-pressed sliding toothed member; and a second intermediate toothed member pivoted upon said connecting member, united to said telephone supporting member and engaging the teeth of said spring-pressed sliding toothed member.

8. In a support for telephones, a pedestal member for attachment to a desk; a member for attachment to a telephone; a connecting member having a sliding toothed member as a part thereof; an intermediate toothed member pivotally connected to said connecting member, supported by said pedestal member and engaging the teeth of said sliding toothed member; a second intermediate toothed member pivoted upon said connecting member, united to said telephone supporting member and engaging the teeth of said sliding toothed member, said first intermediate toothed member being adapted to slide said sliding toothed member in said connecting member when said connecting member is rotated upon said first intermediate toothed member; and a spring engaging at one end said sliding toothed member and at the other end said connecting member and acting to oppose the movement of said sliding toothed member when said connecting member is moved from a vertical position.

9. In a support for telephones, an anchored toothed member; a second member pivoted thereupon; a third member sliding within said second member and geared to said anchored member, whereby the rotation of said second member upon said anchored member will move said sliding member within said second member; a telephone-holding member pivoted upon said second member and geared to said sliding member, whereby by control of said telephone-holding member by said anchored member through said sliding member said telephone-holding member maintains parallelism with its initial position.

10. In a support for telephones, an arm; two toothed circular segments pivoted upon said arm; and a sliding rack within said arm and engaging said segments whereby parallelism of the vertical axes of said segments is maintained.

11. In a support for telephones, an arm; two toothed circular segments pivoted upon said arm; and a spring-pressed sliding rack carried by said arm and engaging said segments.

12. In a support for telephones, an arm; a rotatable member upon said arm, and a member upon which said arm is rotatably supported each of said members having an edge of gear teeth; and a sliding toothed rack carried by said arm and engaging the teeth of both of said members.

13. In a support for telephones, an arm; a rotatable member upon said arm, and a member upon which said arm is rotatably supported each of said members having an edge of gear teeth; and a spring-pressed sliding toothed rack carried by said arm and engaging the teeth of both of said members.

Signed by us at Chicago, county of Cook and State of Illinois in the presence of two witnesses.

KEMPSTER B. MILLER.
WILLIAM KAISLING.

Witnesses:
DAVID S. HULFISH,
HARRIET L. SMITH.

---

Copies of this patent may be obtained for five cents each, by addressing the "Commissioner of Patents, Washington, D. C."